United States Patent [19]
Bailey et al.

[11] Patent Number: 5,835,091
[45] Date of Patent: Nov. 10, 1998

[54] MANIPULATING AND DISPLAYING A PLURALITY OF VIEWS IN A GRAPHICAL USER INTERFACE

[75] Inventors: John Hudson Bailey; Stanley Edward Taylor, both of San Jose; Robert O. Turek, Morgan Hill, all of Calif.; Mary Anne Buttigieg, Etobicoke, Canada

[73] Assignee: International Business Machines Corporation, Armonk, N.Y.

[21] Appl. No.: 700,821

[22] Filed: Aug. 21, 1996

[51] Int. Cl.[6] .................................................. G06F 3/14
[52] U.S. Cl. .......................... 345/345; 345/346; 345/357; 345/342
[58] Field of Search ..................................... 345/345, 344, 345/342, 346, 340, 339, 356, 357, 350, 341

[56] References Cited

U.S. PATENT DOCUMENTS

| | | | |
|---|---|---|---|
| 5,237,651 | 8/1993 | Randall | 345/350 |
| 5,392,387 | 2/1995 | Fitzpatrick et al. | 345/350 |
| 5,416,895 | 5/1995 | Anderson et al. | 345/344 X |
| 5,430,839 | 7/1995 | Jagannathan et al. | 345/357 |
| 5,438,662 | 8/1995 | Randall | 345/350 |
| 5,515,497 | 5/1996 | Itri et al. | 345/350 |
| 5,668,964 | 9/1997 | Helsel et al. | 345/350 |

*Primary Examiner*—Raymond J. Bayerl
*Attorney, Agent, or Firm*—Merchant, Gould, Smith, Edell, Welter, & Schmidt

[57] ABSTRACT

A method, apparatus, and article of manufacture for managing and displaying a plurality of views of information in a graphical user interface, with views grouped together to form a stack upon which operations that jointly manipulate the views may be performed. A viewclip mechanism is associated with a stack to provide one or more mechanisms for performing actions on the stack such as shuffling forward and backward through views, directly accessing specific views, and unlocking a stack to permit views to be added or removed from the stack. The stack is represented as a single frame which displays one of the views at a time as its contents. Frame manipulation mechanisms, e.g., minimizing, maximizing, resizing, and repositioning, may be applied to the frame to jointly manipulate display characteristics of the plurality of views in the stack.

36 Claims, 6 Drawing Sheets

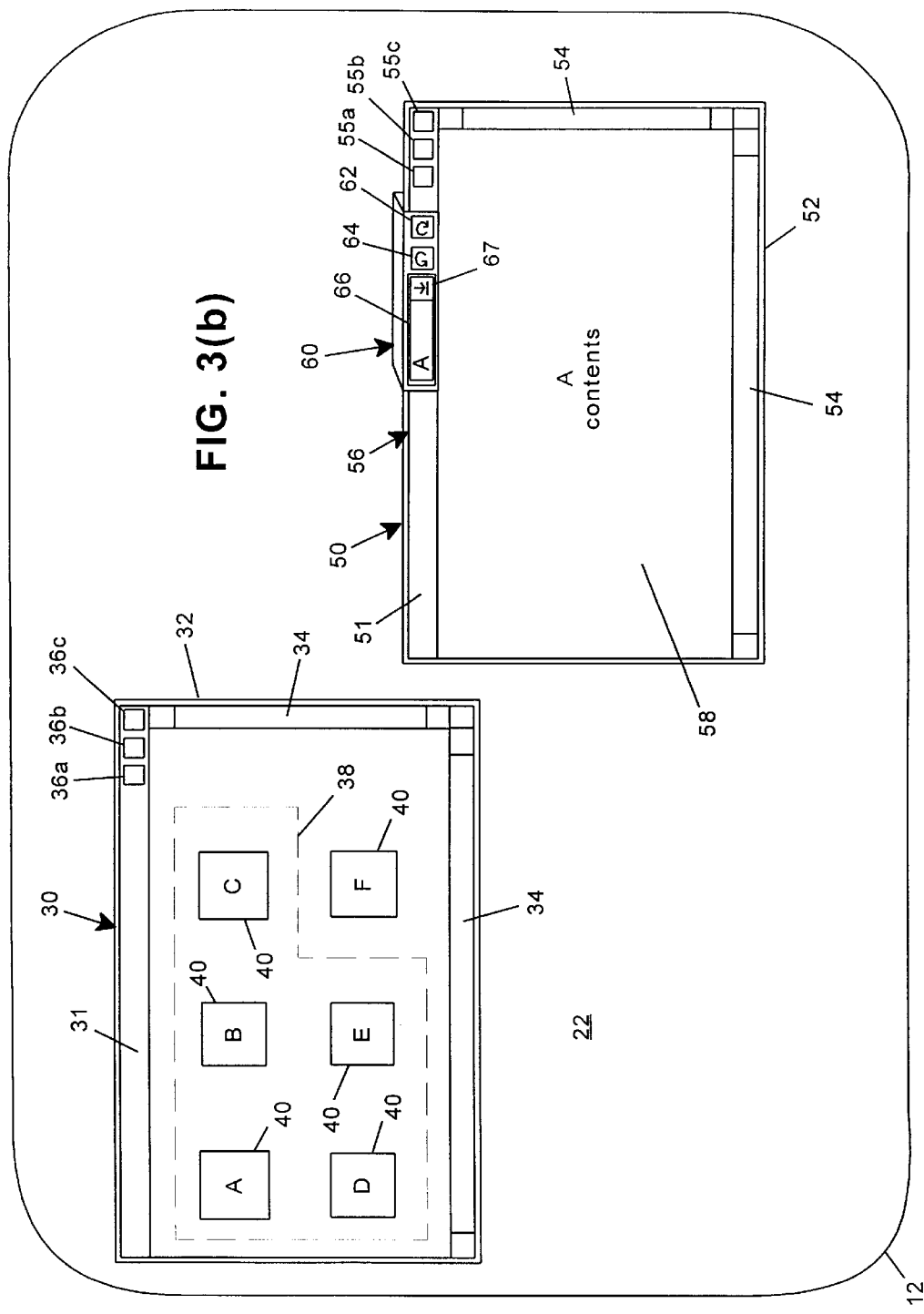

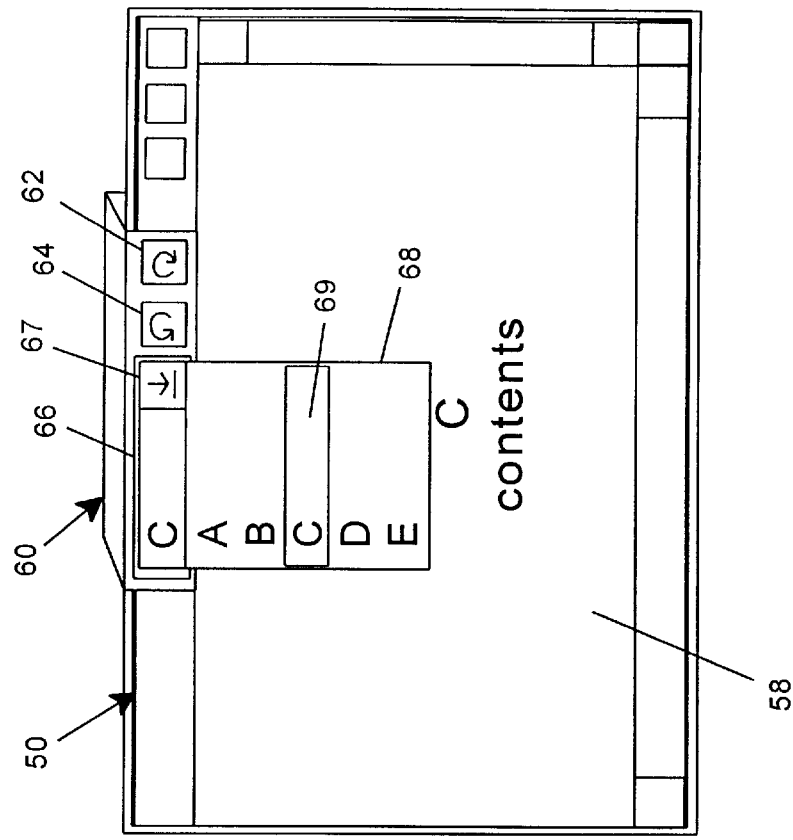
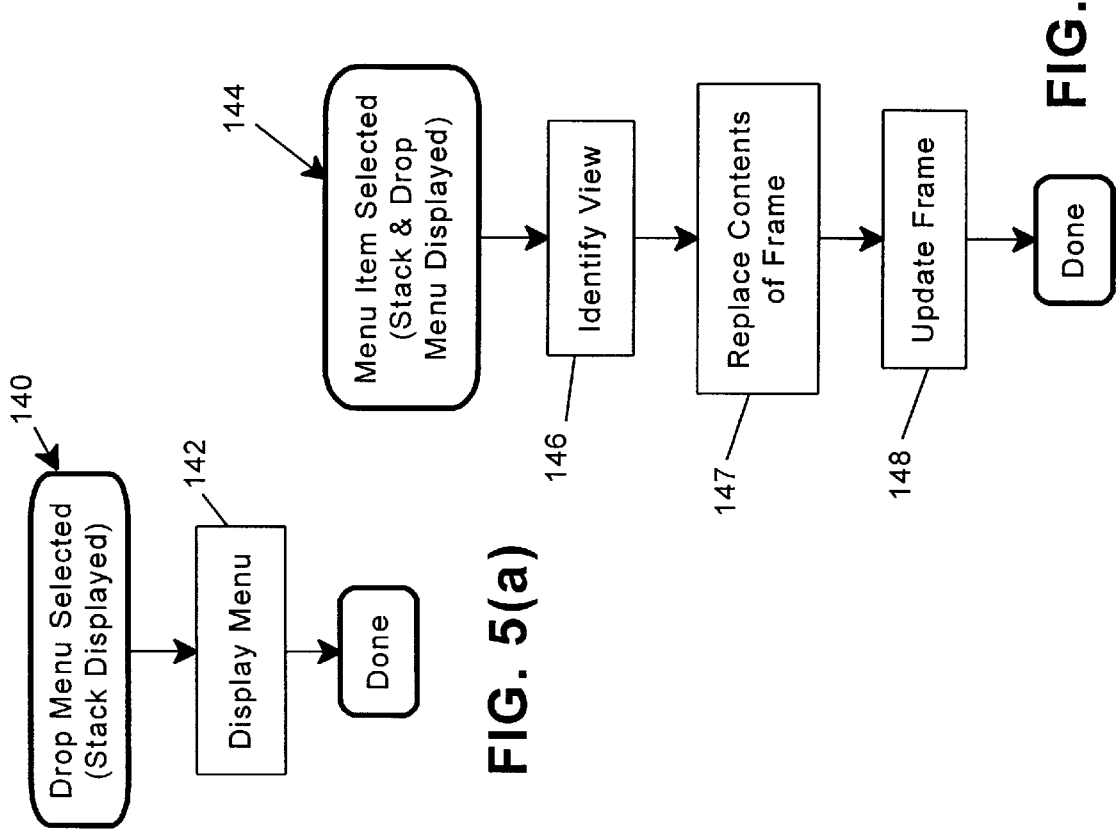
FIG. 5(c)
FIG. 5(b)
FIG. 5(a)

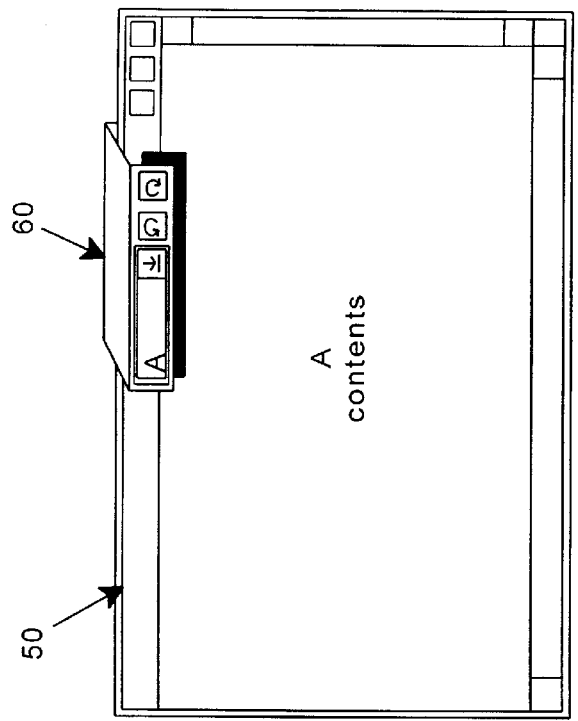
FIG. 6(c)
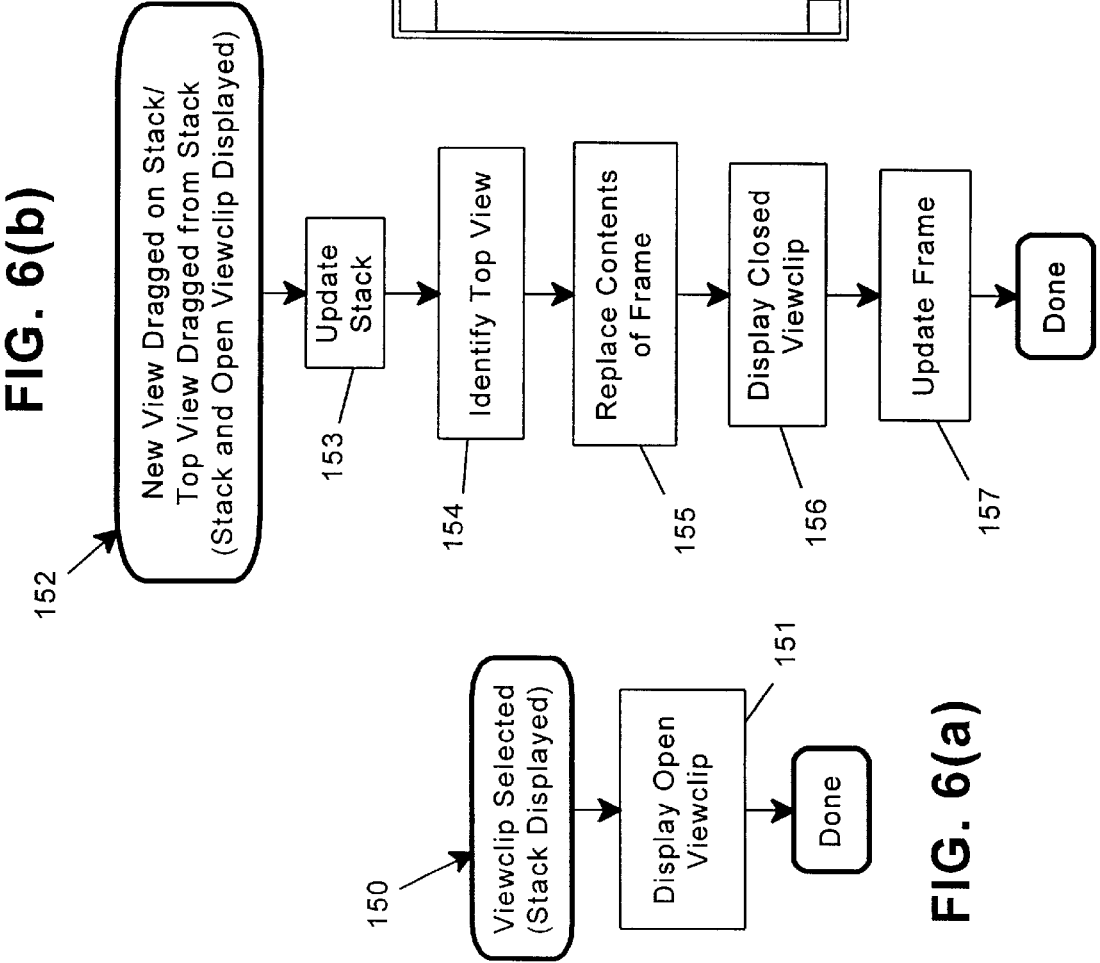
FIG. 6(b)
FIG. 6(a)

5,835,091

MANIPULATING AND DISPLAYING A PLURALITY OF VIEWS IN A GRAPHICAL USER INTERFACE

BACKGROUND OF THE INVENTION

1. Field of the Invention

The present invention relates generally to graphical user interfaces, and in particular, to a method, apparatus, and article of manufacture for manipulating and displaying a plurality of views in a graphical user interface.

2. Description of the Related Art

Graphical user interfaces (GUIs) have greatly enhanced the usability and productivity of computer software. Most graphical user interfaces, e.g., as found in the IBM OS/2, Microsoft Windows, and Apple Macintosh operating systems, and some versions of the UNIX operating system, data is supplied to a user through one or more windows, or views. Individual windows may include various user interface (UI) mechanisms or controls for modifying the appearance of a window. Most graphical user interfaces (GUI) allow windows to be minimized, maximized, resized, repositioned, opened, closed, etc. Moreover, the contents of a window (i.e., the information presented within the window may be scrolled using scroll bar mechanisms.

With many systems, in particular many object-oriented systems, there may be proliferation of windows when a large amount of information is presented to a user as multiple windows. Windows may be hidden below other windows, and a user may be required to manipulate several windows before locating and viewing a desired window. Furthermore, the proliferation of windows results in a cluttered presentation of information that is inefficient and often counterproductive. In general, it is often difficult to arrange all of the information presented in multiple windows by a conventional GUI to enable quick, easy and efficient access, display and processing of the information contained in such windows, while minimizing proliferation and clutter.

SUMMARY OF THE INVENTION

To address the requirements described above, the present invention discloses a method, apparatus, and article of manufacture for manipulating and displaying a plurality of windows or views of information in a graphical user interface, wherein views are grouped together to form a stack upon which operations that jointly manipulate the views may be performed. In the preferred embodiments, a viewclip mechanism is associated with a stack of views to provide one or more mechanisms for performing actions on the stack. Mechanisms such as shuffling forward and backward through the views, directly accessing specific views, and unlocking the stack to permit views to be added or removed therefrom, may be incorporated into the preferred embodiment.

Moreover, the stack may be represented within a single frame that displays one view from the stack at a time. Manipulation mechanisms, e.g., minimizing, maximizing, resizing, and repositioning, may be applied to the view to jointly manipulate display characteristics of the plurality of views in the stack.

BRIEF DESCRIPTION OF THE DRAWINGS

Referring now to the drawings in which like reference numbers represent corresponding parts throughout:

FIG. 3(b) is a block diagram of a computer generated display illustrating the operation of the routine of FIG. 3(a);

FIG. 5(a) is a flow chart illustrating the general logic of a drop menu selected routine;

FIG. 5(b) is a flow chart illustrating the general logic of a menu item selected routine;

FIG. 5(c) is a block diagram of a computer generated display illustrating the operation of the routines of FIGS. 5(a) and 5(a);

FIG. 6(a) is a flow chart illustrating the general logic of a viewclip selected routine;

FIG. 6(b) is a flow chart illustrating the general logic of a new view dragged on stack/top view dragged from stack routine;

FIG. 6(c) is a block diagram of a computer generated display illustrating the operation of the routines of FIGS. 6(a) and 6(b)

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
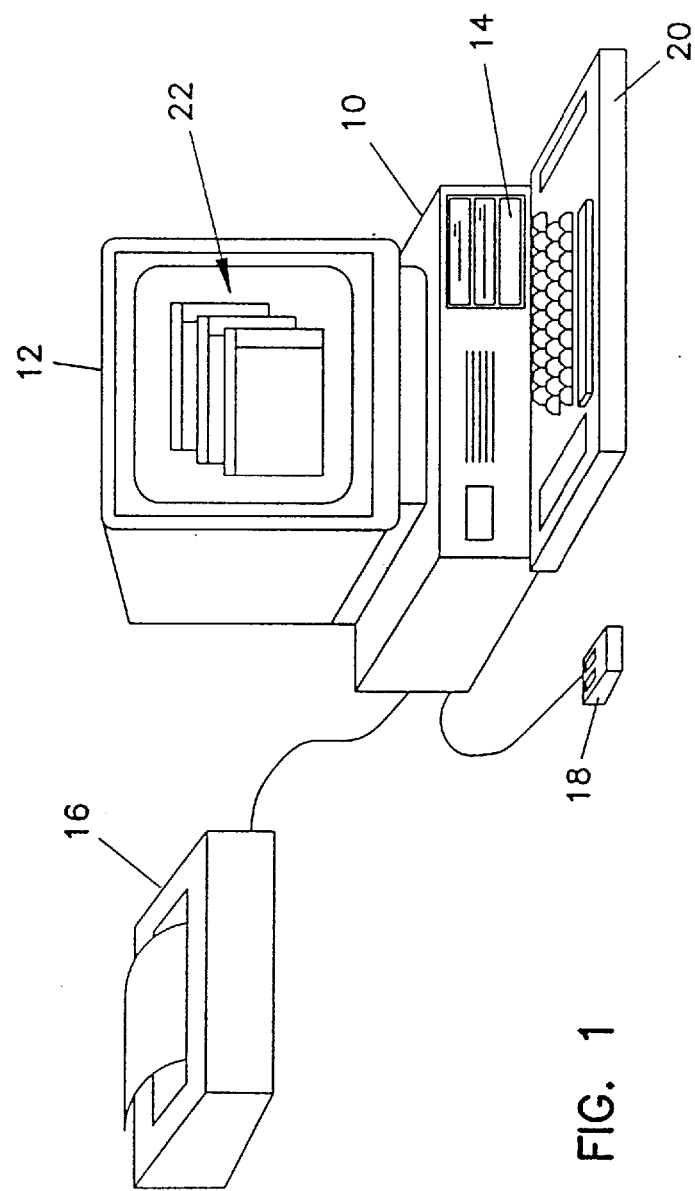
FIG. 1 is a block diagram illustrating an exemplary hardware environment used to implement the preferred embodiment of the invention.

FIG. 1 is an exemplary hardware environment used to implement the preferred embodiment of the invention. The present invention is typically implemented using a personal computer 10, which generally includes, inter alia, a processor, random access memory (RAM), read only memory (ROM), a video card, bus interface, and/or other components. It is envisioned that attached to the personal computer 10 may be a monitor 12 (e.g., a CRT, an LCD display, or other display device), data storage devices 14 such as hard, floppy, and/or CD-ROM disk drives, and printer 16 peripherals. Also included in the preferred embodiment may be input devices, for example, a mouse pointing device 18 and a keyboard 20. Those skilled in the art will recognize that any combination of the above components, or any number of different components, peripherals, and other devices, may be used with the computer 10.

The personal computer 10 operates under the control of an operating system 22, which is represented in FIG. 1 by the screen display on the monitor 12. The present invention is preferably implemented within operating system 22, although it should be understood that, in the alternative, the principles of the invention may also apply to specific applications or other computer programs executed on the computer. In general, the routines executed to implement the present invention, whether implemented as part of an operating system or a specific application, will be referred to herein as "computer programs".

Generally, the computer programs which implement the preferred embodiment of the invention are tangibly embodied in a computer-readable medium or carrier, e.g., one or more of the fixed and/or removable data storage data devices 14. Under control of operating system 22, the computer programs may be loaded from the data storage devices 14 into the memory of computer 10. The computer programs comprise instructions which, when read and executed by computer 10, cause the computer 10 to perform the steps necessary to execute the steps or elements of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Software Implementation

The present invention principally operates by grouping views together into a "stack" construct displayed on the monitor 12, which permits joint manipulation of the views. In the preferred embodiment, a stack of views is displayed in a single frame on the monitor 12, with only one view (designated as a "top view") visible as the contents of the frame. The remaining views are not displayed, and may be considered to be, in effect, hidden behind the top view on the monitor 12.

"Views" within the context of the invention may include any arrangement of information suitable for display within a window on the monitor 12. In the preferred embodiment, individual views may represent more detailed information regarding particular "objects", e.g., in an object-oriented operating system 22. However, it should be appreciated that a view may contain any arrangement of information suitable for display to a user by the computer 10, and thus need not be tied to any particular object.

Figure 2:
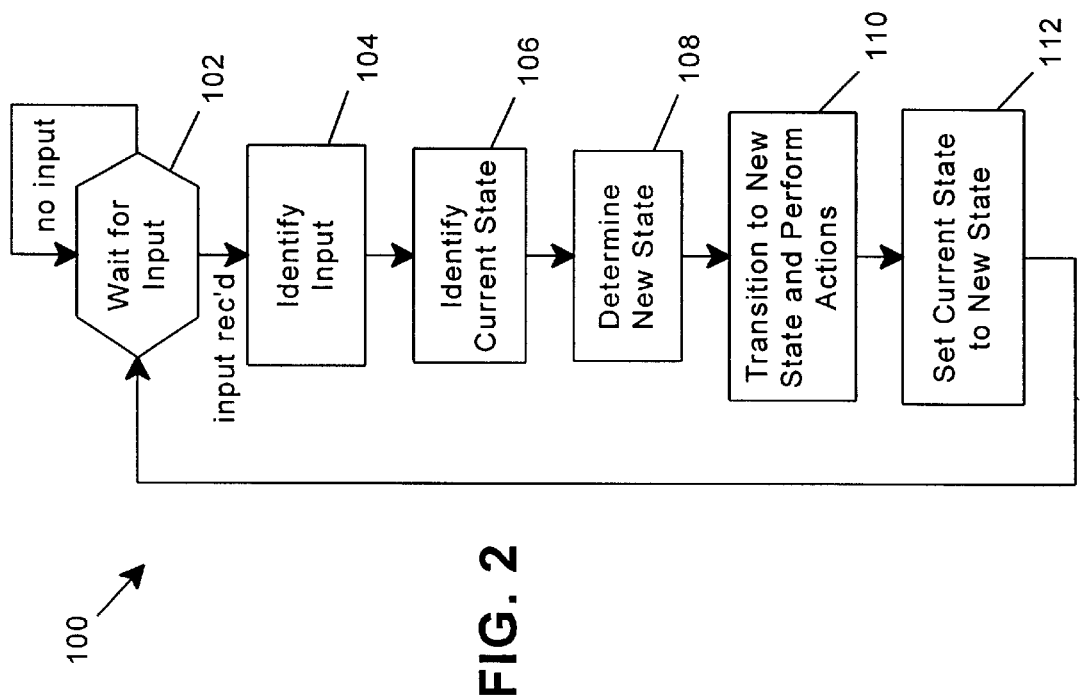
FIG. 2 is a flow chart illustrating the general logic for handling user input events in the preferred software implementation of the preferred embodiment of the invention.

FIG. 2 is a flow chart that illustrates the general logic of a task or event driven operating system 22 performing the steps of the present invention, and more specifically, an input task or routine 100 for handling user input in such a system 22. In such a system 22, operations are performed when transitions are made, based upon input events, from present or current states to new states.

Generally, routine 100 begins by waiting at block 102 for an input event (e.g., a mouse button click). It should be appreciated that during this time, other operating system 22 tasks, e.g., file, memory, and video tasks, etc., may also be carried out. When an input event occurs, control passes to block 104 to identify the input event. Based upon the input event, as well as the current state of the system 22 determined in block 106, a new state is determined in block 108. In block 110, the routine 100 transitions to the new state and performs any actions required for the transition. In block 112, the current state is set to the previously determined new state, and control returns to block 102 to wait for more input events.

The specific operations that are performed by block 110 when transitioning between states will vary depending upon the current state and the input event. The various operations required to implement and maintain the stack construct of the present invention represent particular events handled by routine 100. However, it should be appreciated that the stack operations represent merely a subset of all of the events handled by any operating system 22.

Several flowcharts which illustrate various operations that may be performed on or with the stack of the present invention are shown in FIGS. 3(a), 4, 5(a), 5(b), 6(a), 6(b) and 7. In each of these flowcharts, the header block thereof indicates the particular input event with the current state denoted in parentheses. For several of these flowcharts, i.e., FIGS. 3(a), 5(a), 5(b), 6(a) and 6(b), corresponding diagrams, i.e., FIGS. 3(b), 5(c) and 6(c), are provided to illustrate the operations of their respective routines.

Figure 3A:
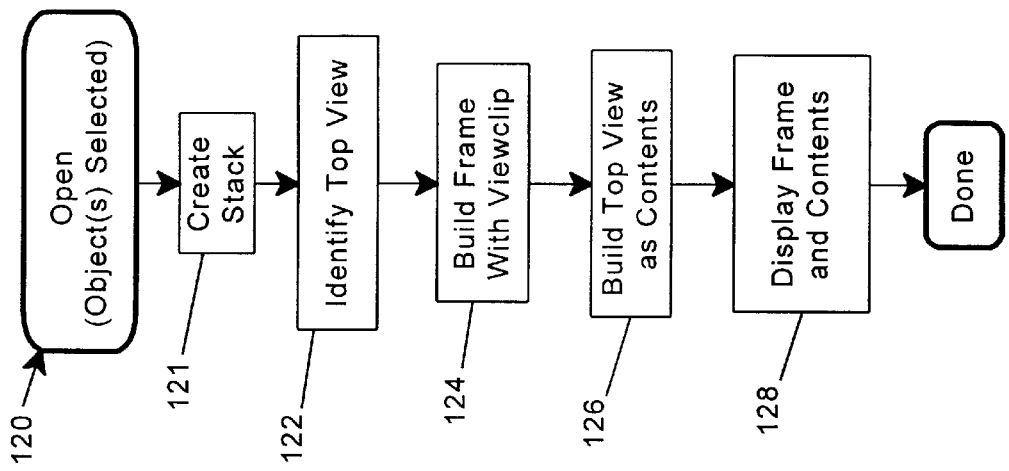
FIG. 3(a) is a flow chart illustrating the general logic for an open routine.

FIG. 3(a) is a flow chart that illustrates the general logic for an open routine 120. FIG. 3(b) is a block diagram of a computer generated display illustrating the operation of the routine of FIG. 3(a). The open routine 120 opens or creates a stack 50 that includes views of several objects 40 (designated A–E) displayed in a frame 30. Frame 30 is illustrative of a typical graphical user interface (GUI) frame for displaying a view, and includes several user interface mechanisms such as a title bar 31 (for repositioning), a border 32 (for resizing), scroll bars 34 (for scrolling), a minimize button 36a, a maximize button 36b and a close button 36c.

In the preferred embodiment, routine 120 is executed whenever an "open" event (e.g., a double-clicked mouse button) is recorded after one or more objects have been selected as indicated by box 38 in FIG. 3(b). Selection of one or more objects 40 may be made in several known manners, e.g., by dragging a box 38 around a group of objects 40 (here objects A–E), or using various mouse/keyboard combinations to select or highlight the objects 40. The act of opening or creating a stack 50 may be initiated by other functions, e.g., selecting the function in a fixed or pop-up menu.

Block 121 creates a stack 50 containing views of each of the selected objects 40, which preferably includes a data structure (e.g., an array, linked list, queue, etc.) suitable for maintaining the list of views on the stack, as well as current ordering and display characteristic data for the stack.

Block 122 identifies a top view to initially display within the frame for the stack, which may be based upon a predetermined ordering or even based upon which object 40 was selected first.

Block 124 creates the frame 50 for display. The frame 50 includes typical user interface mechanisms such as a title bar 51, a border 52, scroll bars 54, a minimize button 55a, a maximize button 55b and a close button 55c. A contents area 58 is defined within the frame 50.

In addition, to identify frame 50 as a stack, block 124 adds a viewclip 60 to the frame 50, wherein the viewclip 60 includes several user interface mechanisms, such as a shuffle forward button 62, a shuffle backward button 64 and a drop down direct access menu 66 that includes a button 67. The viewclip 60 in the preferred embodiment may be visually represented as a binder clipped to the top of the frame 50, although other visual representations, e.g., a group of rings, a paper clip, an existing toolbar or menu, etc., as well as representations that do not relate to real world objects, may also be used to represent the viewclip 60.

In block 126, the top view is built and added as the contents 58 of the frame 50. For example, where object A is the first objected selected, a view associated with object A may initially be shown in the content area 58 of frame 50.

In block 128, the frame 50 and its contents are displayed to a user, e.g., as shown in FIG. 3(b). Opening or creating of the stack 50 is then complete. It should be appreciated that all of the views in the stack 50 may not need to be built upon creating of the stack 50, thereby reducing system overhead in the operation.

Once a stack 50 is created, various operations are preferably provided to jointly manipulate the views grouped in the stack 50. The manner in which a stack 50 of views may be jointly manipulated fall generally into three categories. The first relates to the use of the viewclip 60, displayed with the stack 50, that permits management of which of the plurality of views is displayed as the top view of the stack 50 (view selection management). The second, which also relies on the viewclip 60, relates to management of the stack 50 data structure, such that views may be added or removed from the stack 50 (list management). The third relates to manipulation of display characteristics of the stack 50 (stack display management).

For view selection management, the primary functions are shuffle-forward (display the next view in the stack 50), shuffle-backward (display the previous view in the stack 50), and direct-access (display a selected view in the stack 50).

Figure 4:
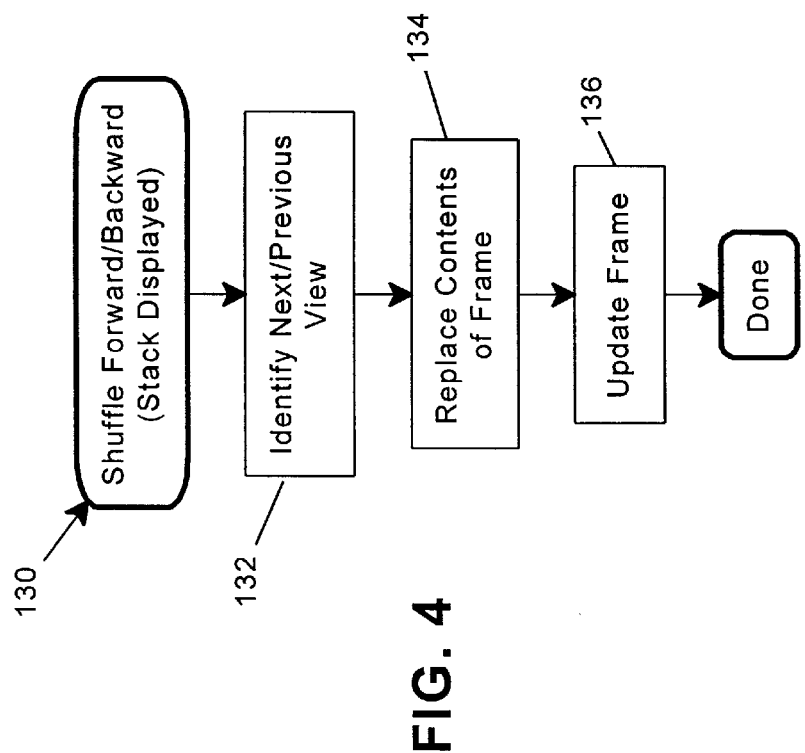
FIG. 4 is a flow chart illustrating the general logic for a shuffle forward/backward routine.

FIG. 4 is a flowchart illustrating the general logic for a shuffle-forward/backward routine. The routine 130 is initiated upon user selection of either the shuffle-forward or shuffle-backward button 62 or 64 when a stack 50 is displayed. Thus, in block 132, depending whether the shuffle-forward or shuffle-backward button 62 or 64 is selected, the immediately subsequent or preceding view in the stack 50 is identified. Block 134 represents the identified view being built and inserted as the new contents 58 of the frame 58. Block 136 updates the frame to display the new frame contents on the monitor 12.

FIG. 5(*a*) is a flowchart illustrating the general logic of a drop menu selected routine and FIG. 5(*b*) is a flowchart illustrating the general logic of a menu item selected routine. FIG. 5(*c*) is a block diagram of a computer generated display illustrating the operation of the routines of FIGS. 5(*a*) and 5(*b*). The direct access menu 66 offers direct access to any view in the stack 50, which may be particularly useful when a large number of views are grouped in a stack 50.

As shown in FIG. 5(*a*), routine 140 is executed whenever a stack is displayed on the monitor 12 and a user selects the drop menu button 67. In block 142, a drop down menu 68 is displayed with a list of the available views in the stack 50. The entire list may be displayed or alternatively, only a few items of the list may be displayed at any given time, with scroll bars provided to enable the entire list to be searched by a user.

Once the drop menu is displayed, routine 144 of FIG. 5(*b*) executes whenever one of the menu items is selected, e.g., where object C 69 is selected in FIG. 5(*c*). Block 146 first identifies the selected view. Block 147 builds the identified view and inserts it as the new contents of the frame 50. Block 148 updates the frame 50 to display the new frame contents 58. In addition, the drop down menu 66 is preferably minimized in conjunction with updating the frame 50.

It should be appreciated that whenever a new view is selected via button 62 or 64 or menu 66, only the content area 58 of frame 50 needs to be replaced. The frame 50 itself (e.g., the border area 57 and the various mechanisms 51–55*c*) often does not need to be updated, thus saving significant overhead.

FIG. 6(*a*) is a flowchart illustrating the general flow of a viewclip selected routine and FIG. 6(*b*) is a flowchart illustrating the general logic of a new view dragged on stack/top view dragged from stack routine. FIG. 6(*c*) is a block diagram a computer generated display illustrating the operation of the routines of FIGS. 6(*a*) and 6(*b*).

For list management functions, an unlock stack operation is implemented in the preferred embodiment of the present invention to permit views to be added and/or removed from the stack. Once a stack is unlocked, the top view may be removed by dragging the view off of the stack, or another view may be added by dragging an existing view onto the stack, or another view maybe added by selecting and opening another object. In such instances, the stack data structure must be updated accordingly. The stack preferably returns to a locked state upon addition or removal of a single view. However, a separate lock operation may be implemented in the alternative to permit multiple views to be added and/or removed from the stack at a time.

As shown in FIG. 5(*a*), a viewclip selected routine 150 handles unlocking or opening of a stack. This routine is executed whenever a stack is displayed on the monitor 12 and a user has selected the viewclip 60 (e.g., by a double mouse click on the viewclip 60 itself). Block 151 displays an "open" viewclip 60 on the monitor 12 to indicate that the stack is unlocked. As shown in FIG. 6(*c*), an open viewclip 60 may be designated on frame 50 as raised and shadowed, e.g., under a "binder" metaphor. Other graphical or textual manners of indicating an open viewclip 60, e.g., shifting the viewclip 60 above the stack, etc. may also be used.

Once the viewclip 60 is opened, two separate events, adding and removing a view, may be handled in a similar manner as illustrated by routine 152 of FIG. 6(*b*). Routine 152 is preferably executed when either a new view is dragged on the stack or when a top view is dragged from the stack. Block 153 updates the stack data structure to reflect the addition or removal of a view. In block 154, a new top view is identified, which, in the case of a deletion, is the next view below the removed view. Block 155 replaces the contents of the frame 50 by building a new top view. Block 156 again displays a closed viewclip 60, and block 157 updates the frame 50. indicating completion of the operation. When a view is removed from the stack, a new independent frame 50 may be created and displayed, or the view may be closed.

Figure 7:
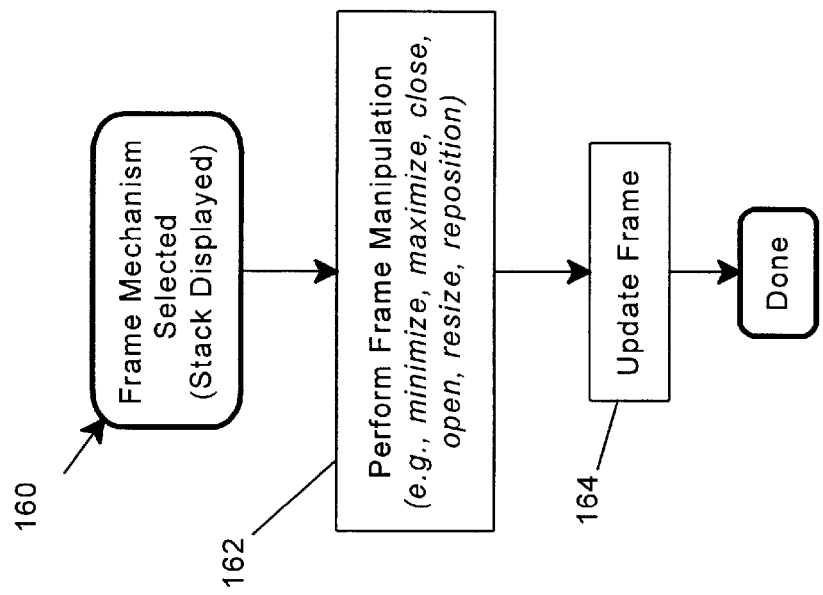
FIG. 7 is a flow chart illustrating the general logic of a frame mechanism selected routine.

FIG. 7 is a flowchart illustrating the general logic of a frame mechanism selected routine. For stack display management functions, standard GUI mechanisms are preferably implemented to permit the display characteristics of the stack to be modified in much the same manner as any window, thereby in effect permitting joint manipulation of the group of views in the stack.

Implementation of these functions is illustrated by routine 160, which is executed whenever a user interface mechanism on a stack is selected. Depending upon which mechanism is selected, block 162 performs the required manipulation steps to modify the display characteristics of the stack (e.g., minimizing, maximizing, closing, opening, resizing, repositioning, etc.). Then, in block 164, the frame 50 is updated accordingly. It should be appreciated that the manipulation functions are standard in many GUI environments, and well understood by those of ordinary skill in the art.

Conclusion

This concludes the description of the preferred embodiment of the invention. The following describes some alternative embodiments for accomplishing the present invention.

For example, any type of computer, such as a mainframe, minicomputer, work station or personal computer, could be used with the present invention. In addition, any software program, application or operating system having a graphical user interface could benefit from the present invention.

Additional functions may also be implemented. In the area of stack creation and list management, for example, views may be added to a stack without opening a viewclip, simply by dragging a view onto a stack. Moreover, when no views remain in a stack, the stack may be displayed as being empty or simply closed. A separate viewclip close function may also be utilized.

In addition, multiple stacks may be created for holding specific classes or types of views such that when an view is created, it is automatically placed on a specific stack of related views. Similarly, applications may be associated with particular stacks such that views created by a particular application are automatically placed on a specific stack.

Also, additional view selection management functions may be implemented, including permitting a view to be brought to the top of a stack when an associated object is selected. Moreover, list elements may be sorted to customize the arrangement of views. List management may also be centralized such that view from multiple stacks may be managed from a master list or director tree structure, e.g., similar to conventional file management techniques. A viewclip may also be displayed as attached or separate from its associated stack.

Moreover, while only one view at a time is preferably displayed for a given stack, multiple views may also be displayed. For example, some or all of the views in a stack may be displayed in a cascaded or tiled fashion.

In summary, the present invention discloses a method, apparatus, and program storage device for managing a plurality of views in a graphical user interface.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of displaying information on a monitor attached to a computer, comprising the steps of:
   (a) displaying at least two views on the monitor attached to the computer;
   (b) receiving a selection of at least two displayed views from a user;
   (c) creating an arrangement of the selected views based on input from a user;
   (d) binding the arranged views into a stack using a viewclip associated with the stack, wherein the viewclip graphically represents command functions for manipulating the stack; and
   (e) displaying the stack comprised of one or more binded views on the monitor, wherein only a top view is visible.

2. The method of claim 1, further comprising displaying a frame for the stack, wherein the top view comprises the frame's contents.

3. The method of claim 2, further comprising the step of updating the frame's contents with a different view in the stack.

4. The method of claim 3, wherein the viewclip includes a shuffle forward button, and the updating step includes the step of updating the frame's contents with an immediately subsequent view in the stack in response to a user's selection of the shuffle forward button.

5. The method of claim 3, wherein the viewclip includes a shuffle backward button, and the updating step includes the step of updating the frame's contents with an immediately preceding view in the stack in response to a user's selection of the shuffle backward button.

6. The method of claim 3, wherein the viewclip includes a direct access menu that has a list of every view in the stack, and wherein the updating step includes the step of updating the frame's contents with a view from the list in response to a user's selection of the view.

7. The method of claim 3, wherein the updating step updates only the frame's contents.

8. The method of claim 2, further comprising the step of updating the frame's contents with a view associated with a selected object in response to a user's selection of the object.

9. The method of claim 2, further comprising the step of modifying a display characteristic of the frame, wherein the modifying step is selected from the group consisting of maximizing the frame, minimizing the frame, resizing the frame, closing the frame, opening the frame, repositioning the frame, and combinations thereof.

10. The method of claim 1, further comprising the step of unlocking the stack to permit views to be added or removed from the stack, the unlocking step including the step of displaying an open viewclip.

11. The method of claim 10 wherein the unlocking step includes the step of automatically locking the stack and displaying a closed viewclip after a view has been added or removed from the stack.

12. The method of claim 1, further comprising the step of creating an association with the stack, such that opening a view associated with the stack automatically adds the view to the stack.

13. A computer programming apparatus, comprising:
   (a) a computer having a monitor attached thereto;
   (b) means, performed by the computer, for displaying at least two views on the monitor attached to the computer;
   (c) means, performed by the computer, for receiving a selection of at least two displayed views from a user;
   (d) means performed by the computer for creating an arrangement of the selected views based on input from a user;
   (e) means, performed by the computer, for binding the arranged views into a stack using a viewclip associated with the stack, wherein the viewclip graphically represents command functions for manipulating the stack; and
   (f) means, performed by the computer, for displaying the stack comprised of one or more binded views on the monitor, wherein only a top view is visible.

14. The apparatus of claim 13, further comprising displaying a frame for the stock, wherein the top view comprises the frame's contents.

15. The apparatus of claim 14, further comprising the means for updating the frame's contents with a different view in the stack.

16. The apparatus of claim 15, wherein the viewclip includes a shuffle forward button, and the means for updating includes the means for updating the frame's contents with an immediately subsequent view in the stack in response to a user's selection of the shuffle forward button.

17. The apparatus of claim 15, wherein the viewclip includes a shuffle backward button, and the means for updating includes the means for updating the frame's contents with an immediately preceding view in the stack in response to a user's selection of the shuffle backward button.

18. The apparatus of claim 15, wherein the viewclip includes a direct access menu that has a list of every view in the stack, and wherein the means for updating includes the means for updating the frame's contents with a view from the list in response to a user's selection of the view.

19. The apparatus of claim 15, wherein the means for updating updates only the frame's contents.

20. The apparatus of claim 14, further comprising the means for updating the frame's contents with a view associated with a selected object in response to a user's selection of the object.

21. The apparatus of claim 14, further comprising the means for modifying a display characteristic of the frame, wherein the means for modifying is selected from the group consisting of maximizing the frame, minimizing the frame, resizing the frame, closing the frame, opening the frame, repositioning the frame, and combination thereof.

22. The apparatus of claim 13, further comprising the means for unlocking the stack to permit views to be added or removed from the stack, the means for unlocking including the means for displaying an open viewclip.

23. The apparatus of claim 22, wherein the means for unlocking includes the means for automatically locking the stack and displaying a closed viewclip after a view has been added or removed from the stack.

24. The apparatus of claim 13, further comprising the means for creating an association with the stack, such that opening a view associated with the stack automatically adds the view to the stack.

25. A program storage device, readable by a computer, tangibly embodying one or more programs of instructions executable by the computer to perform method steps of displaying information on a monitor attached to the computer, the method comprising the steps of:

(a) displaying at least two views on the monitor attached to the computer;

(b) receiving a selection of at least two displayed views from a user;

(c) creating an arrangement of the selected views based on input from a user;

(d) binding the arranged views into a stack using a viewclip associated with the stack, wherein the viewclip graphically represents command functions for manipulating the stack; and (e) displaying the stack comprised of one or more binded views on the monitor, wherein only a top view is visible.

26. The program storage device of claim 25, further comprising displaying a frame for the stack, wherein the top view comprises the frame's contents.

27. The program storage device of claim 26, further comprising the step of updating the frame's contents with a different view in the stack.

28. The program storage of claim 27, wherein the viewclip includes a shuffle forward button, and the updating step includes the step of updating the frame's contents with an immediately subsequent view in the stack in response to a user's selection of the shuffle forward button.

29. The program storage device of claim 27, wherein the viewclip includes a shuffle backward button, and the updating step includes the step of updating the frame's contents with an immediately preceding view in the stack in response to a user's selection of the shuffle backward button.

30. The program storage device of claim 27, wherein the viewclip includes a direct access menu that has a list of every view in the stack, and wherein the updating step includes the step of updating the frame's contents with a view from the list in response to a user's selection of the view.

31. The program storage device of claim 27, wherein the updating step updates only the frame's contents.

32. The program storage device of claim 26, further comprising the step of updating the frame's contents with a view associated with a selected object in response to a user's selection of the object.

33. The program storage device of claim 26, further comprising the step of modifying a display characteristic of the frame, wherein the modifying step is selected from the group consisting of maximizing the frame, minimizing the frame, resizing the frame, closing the frame, opening the frame, repositioning the frame, and combinations thereof.

34. The program storage device of claim 25, further comprising the step of unlocking the stack to permit views to be added or removed from the stack, the unlocking step including the step of displaying an open viewclip.

35. The program storage device of claim 34 wherein the unlocking step includes the step of automatically locking the stack and displaying a closed viewclip after a view has been added or removed from the stack.

36. The program storage device of claim 24, further comprising the step of creating an association with the stack, such that opening a view associated with the stack automatically adds the view to the stack.

* * * * *